United States Patent
Zhao et al.

(10) Patent No.: US 11,423,201 B2
(45) Date of Patent: Aug. 23, 2022

(54) METHOD AND SYSTEM FOR DETERMINING HELICOPTER ROTOR AIRFOIL

(71) Applicant: Nanjing University of Aeronautics and Astronautics, Jiangsu (CN)

(72) Inventors: Qijun Zhao, Jiangsu (CN); Bo Wang, Jiangsu (CN); Simeng Jing, Jiangsu (CN); Guoqing Zhao, Jiangsu (CN); Xi Chen, Jiangsu (CN); Qing Wang, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 0 days.

(21) Appl. No.: 17/312,336

(22) PCT Filed: Aug. 7, 2020

(86) PCT No.: PCT/CN2020/107732
§ 371 (c)(1),
(2) Date: Jun. 9, 2021

(87) PCT Pub. No.: WO2021/077855
PCT Pub. Date: Apr. 29, 2021

(65) Prior Publication Data
US 2022/0033062 A1    Feb. 3, 2022

(30) Foreign Application Priority Data
Oct. 24, 2019   (CN) .......................... 201911017404.0

(51) Int. Cl.
*G06F 30/28*    (2020.01)
*G06F 30/15*    (2020.01)
(Continued)

(52) U.S. Cl.
CPC ............ *G06F 30/28* (2020.01); *B64C 27/467* (2013.01); *G06F 30/15* (2020.01); *G06K 9/6256* (2013.01);
(Continued)

(58) Field of Classification Search
CPC ...... G06F 30/28; G06F 30/15; G06F 2111/06; G06F 2113/08; G06F 30/20;
(Continued)

(56) References Cited

U.S. PATENT DOCUMENTS

2019/0256197 A1    8/2019   Sikavi

FOREIGN PATENT DOCUMENTS

| CN | 110334449 A | 10/2019 |
|----|-------------|---------|
| CN | 110705126 A | 1/2020 |
| EP | 3543108 A1  | 9/2019  |

OTHER PUBLICATIONS

S. Rajagopal, et al., "Multidisciplinary Design Optimization of a UAV Wing using Kriging based Multi-Objective Genetic Algorithm," Structures, Structural Dynamics, and Materials Conference, pp. 1-18 (Year: 2009).*

(Continued)

*Primary Examiner* — Steven W Crabb
(74) *Attorney, Agent, or Firm* — Kenealy Vaidya LLP

(57) ABSTRACT

The present disclosure provides a method and system for determining a helicopter rotor airfoil. The method includes: randomly generating a sample point by using a Latin hypercube sampling (LHS) method (S1); determining characterization equations of upper and lower airfoil surfaces of an airfoil based on the airfoil sample point by using a class shape transformation (CST) method (S2); performing dynamic characteristic simulation on the airfoil according to the characterization equations of the upper and lower airfoil surfaces by using a computational fluid dynamics (CFD)
(Continued)

method, to obtain a flow field characteristic of the airfoil (S3); establishing a mapping relationship between the sample point and the flow field characteristic by using a Kriging model, and training the mapping relationship by using a maximum likelihood estimation method and an expected improvement (EI) criterion, to obtain a trained mapping relationship (S4); determining an optimal sample point based on the trained mapping relationship by using Non-dominated Sorting Genetic Algorithm II (NSGA-II) (S5); and determining a rotor airfoil based on the optimal sample point (S6). The method performs optimized design on aerodynamic characteristics of the airfoil in a state with a changing incoming flow and a changing angle of attack, and can effectively alleviate dynamic stall in this state.

10 Claims, 7 Drawing Sheets

(51) Int. Cl.
  *B64C 27/467*     (2006.01)
  *G06K 9/62*       (2022.01)
  *G06F 113/08*     (2020.01)
  *G06F 111/06*     (2020.01)

(52) U.S. Cl.
  CPC ....... *G06F 2111/06* (2020.01); *G06F 2113/08* (2020.01)

(58) Field of Classification Search
  CPC .. B64C 27/467; G06K 9/6256; G06V 10/774; G06V 30/19147
  See application file for complete search history.

(56) References Cited

OTHER PUBLICATIONS

Wang Qing et al., "Aerodynamic shape optimization for alleviating dynamic stall characteristics of helicopter rotor airfoil," Chinese Journal of Aeronautics, vol. 28, pp. 346-356 (Year: 2015).*
Zhao Ke, et al., "Aerodynamic optimization of rotor airfoil based on multi-layer hierarchical constraint method," Chinese Journal of Aeronautics, vol. 29, pp. 1541-1552 (Year: 2016).*
International Search Report for PCT Patent App. No. PCT/CN2020/107732 (dated Nov. 10, 2020), with English Translation.
Written Opinion for PCT Patent App. No. PCT/CN2020/107732 (dated Apr. 29, 2020).

* cited by examiner (a)

(b)

(c)

METHOD AND SYSTEM FOR DETERMINING HELICOPTER ROTOR AIRFOIL

CROSS REFERENCE TO RELATED APPLICATION(S)

This application is a national phase filing under 35 C.F.R. § 371 of and claims priority to PCT Patent Application No. PCT/CN2020/107732, filed on Aug. 7, 2020, which claims priority to the Chinese Patent Application No. 201911017404.0, filed with the China National Intellectual Property Administration (CNIPA) on Oct. 24, 2019, and entitled "METHOD AND SYSTEM FOR DETERMINING HELICOPTER ROTOR AIRFOIL", the contents of each of which are hereby incorporated by reference in their entireties.

BACKGROUND

Some embodiments of the present disclosure relate to the technical field of rotor airfoil design, and in particular, to a method and system for determining a helicopter rotor airfoil.

A rotor is a key lift and control component of a helicopter. Aerodynamic characteristics of an airfoil have influence on aerodynamic performance and control characteristics of the rotor and the helicopter. When the helicopter flies forward, rotor blades perform rotation, flapping, and pitching simultaneously. In this way, blade sections are under periodically changing incoming flows and angles of attack, and dynamic stall may occur on a trailing side, resulting in a sharp drop in lift and a sudden increase in drag and moments. This is not conducive to flight. Therefore, reducing or even avoiding the occurrence of dynamic airfoil stall in a rotor environment plays a role in improving the aerodynamic performance and control performance of the rotor.

A lot of research work has been done on design of a helicopter rotor airfoil at home and abroad. Some aviation-developed countries have established corresponding helicopter-specific airfoil libraries, including Boeing's VR series, OA series in France, TsAGI series in Russia, and the like. For the rotor airfoil, NASA, ONERA and Boeing have proposed their own airfoil design indicators. Researchers at home and abroad have also been devoted to designing the rotor airfoil. However, all or most of these mainly consider static characteristics of the airfoil and dynamic characteristics of the airfoil in a condition with a constant velocity and a changing angle of attack. Currently, for an actual rotor environment, rotor airfoil design is still unavailable for a condition with a changing incoming flow and a changing angle of attack.

SUMMARY

In view of this, it is desired to provide a method and system for determining a helicopter rotor airfoil, to perform, based on an actual working environment of a rotor airfoil, optimization design on aerodynamic characteristics of the airfoil in a condition with a changing incoming flow and a changing angle of attack, thereby effectively alleviating dynamic stall in this condition.

To achieve the above aspect, the present disclosure provides the following solutions:

The present disclosure provides a method for determining a helicopter rotor airfoil, including:

randomly generating a sample point by using a Latin hypercube sampling (LHS) method;

determining characterization equations of upper and lower airfoil surfaces of an airfoil based on the sample point by using a class shape transformation (CST) method;

performing dynamic characteristic simulation on the airfoil according to the characterization equations of the upper and lower airfoil surfaces by using a computational fluid dynamics (CFD) method, to obtain a flow field characteristic of the airfoil, where the flow field characteristic includes a lift coefficient, a drag coefficient, and a moment coefficient;

establishing a mapping relationship between the sample point and the flow field characteristic by using a Kriging model, and training the mapping relationship by using a maximum likelihood estimation method and an expected improvement (EI) criterion, to obtain a trained mapping relationship;

determining an optimal sample point based on the trained mapping relationship by using Non-dominated Sorting Genetic Algorithm II (NSGA-II), where the optimal sample point corresponds to an optimal flow field characteristic, and the optimal flow field characteristic includes an optimal lift coefficient, an optimal drag coefficient, and an optimal moment coefficient; and determining a rotor airfoil based on the optimal sample point.

The present disclosure further provides a system for determining a helicopter rotor airfoil, including:

a sample point generation module, configured to randomly generate a sample point by using an LHS method;

an airfoil surface equation determining module, configured to determine characterization equations of upper and lower airfoil surfaces of an airfoil based on the sample point by using a CST method;

a flow field characteristic calculation module, configured to perform dynamic characteristic simulation on the airfoil according to the characterization equations of the upper and lower airfoil surfaces by using a CFD method, to obtain a flow field characteristic of the airfoil, where the flow field characteristic includes a lift coefficient, a drag coefficient, and a moment coefficient;

a mapping relationship calculation module, configured to establish a mapping relationship between the sample point and the flow field characteristic by using a Kriging model, and train the mapping relationship by using a maximum likelihood estimation method and an EI criterion, to obtain a trained mapping relationship;

a multi-objective optimization module, configured to determine an optimal sample point based on the trained mapping relationship by using NSGA-II, where the optimal sample point corresponds to an optimal flow field characteristic, and the optimal flow field characteristic includes an optimal lift coefficient, an optimal drag coefficient, and an optimal moment coefficient; and an airfoil determining module, configured to determine a rotor airfoil based on the optimal sample point.

Compared with the related art, the present disclosure has the following beneficial effects:

The present disclosure provides the method and system for determining a helicopter rotor airfoil. An optimization method for determining dynamic characteristics of the airfoil in the condition with the changing incoming flow and the changing angle of attack is constructed based on the CST method, the LHS method, the CFD method, and a multi-objective genetic algorithm NSGA-II. An optimized airfoil determined by using the method or the system can effectively suppress a leading edge vortex of the airfoil in the condition with the changing incoming flow and the changing angle of attack, so that lift, drag, and moments of the airfoil are not affected when the leading edge vortex moves on or falls off a surface of the airfoil, thereby avoiding a sharp drop in the lift and divergence of the drag and the moment, and greatly improving dynamic aerodynamic characteristics of the airfoil.

BRIEF DESCRIPTION OF THE DRAWINGS

To describe the technical solutions in the embodiments of the present disclosure or in the related art more clearly, the following briefly describes the accompanying drawings for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The technical solutions in the embodiments of the present disclosure are clearly and completely described below with reference to the accompanying drawings in the embodiments of the present disclosure. Apparently, the described embodiments are a part rather than all or most of the embodiments of the present disclosure. All or most other embodiments obtained by a person of ordinary skill in the art based on the embodiments of the present disclosure without creative efforts shall fall within the protection scope of the present disclosure.

To make aspects, features, and advantages of the present disclosure more comprehensible, the following describes the present disclosure in more detail with reference to accompanying drawings and specific implementations.

Figure 1:
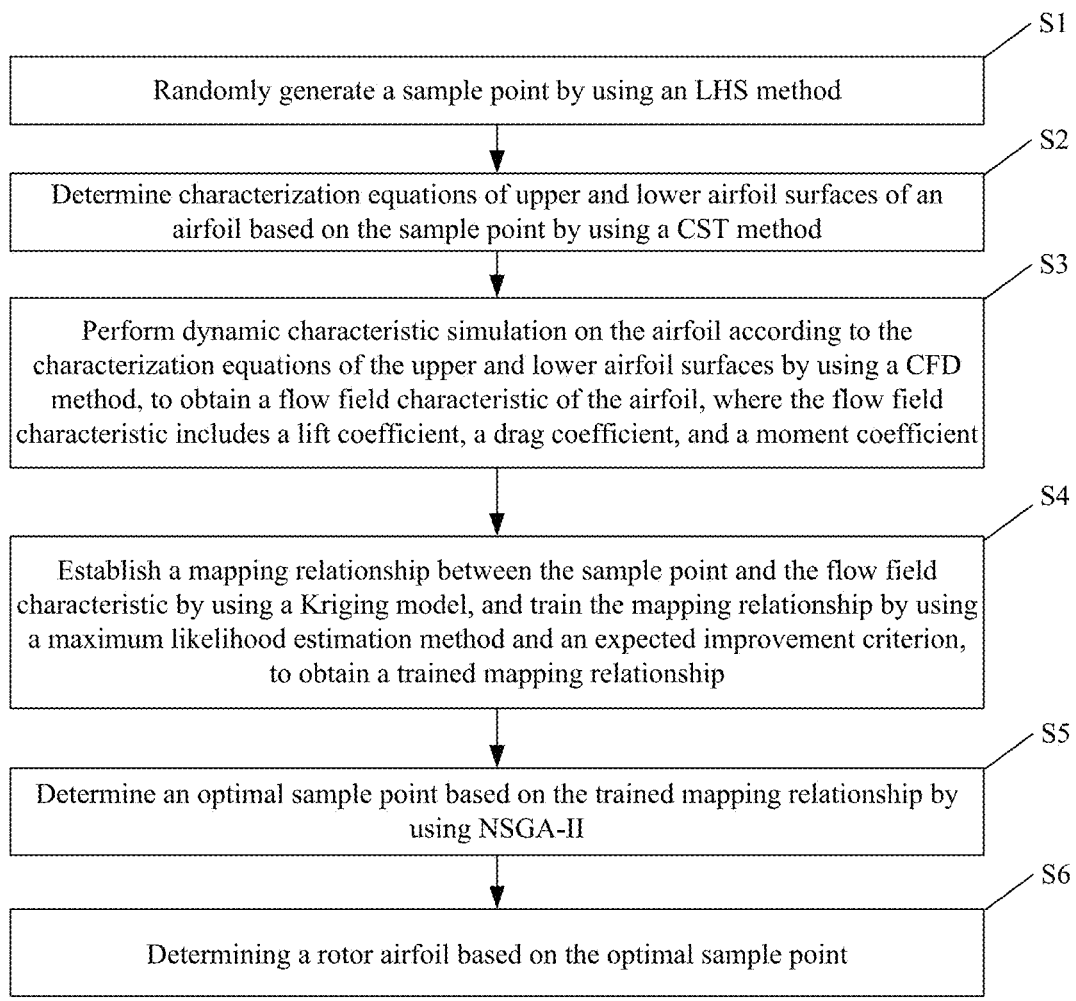
FIG. 1 is a flowchart of a method for determining a helicopter rotor airfoil according to an embodiment of the present disclosure.

Refer to FIG. 1. A method for determining a helicopter rotor airfoil in an embodiment includes the following steps.

Step S1: Randomly generate a sample point by using an LHS method.

The step S1 is specifically: generating a sample point $x_j^i$ by using the LHS method, where j represents a number of the sample point, and i represents a number of a variable. It is assumed that m samples are to be extracted from n-dimensional vector space. LHS includes the following steps:

(1) dividing each dimension into m non-overlapping intervals, so that all or most the intervals have a same probability; (2) randomly extracting a point from each interval of each dimension; and (3) extracting, from each dimension, the point selected in the step (2), to constitute a vector.

Step S2: Determine characterization equations of upper and lower airfoil surfaces of an airfoil based on the sample point by using a CST method. In this step, the CST method is used to fit a baseline airfoil and generate an airfoil in sample space. Based on the CST method, the upper and lower airfoil surfaces of the airfoil may be represented as follows:

$$\begin{cases} \psi_u(\zeta) = C(\zeta) \cdot \sum_{k=0}^{n} A_u^k \cdot S_k(\zeta) + \zeta \cdot \Delta z_u \\ \psi_l(\zeta) = C(\zeta) \cdot \sum_{k=0}^{n} A_l^k \cdot S_k(\zeta) + \zeta \cdot \Delta z_l \end{cases}$$

where $\psi_u = y_u/c$, $\psi_l = y_l/c$; $\psi_u$ represents a dimensionless vertical coordinate of a point on the upper airfoil surface of the airfoil; $\psi_l$ represents a dimensionless vertical coordinate of a point on the lower airfoil surface of the airfoil; $y_u$ represents a vertical coordinate of the point on the upper airfoil surface of the airfoil; $y_l$ represents a vertical coordinate of the point on the lower airfoil surface of the airfoil; c represents a chord length of the airfoil; $\zeta = x/c$; $\zeta$ represents a dimensionless horizontal coordinate of a point on the airfoil; x represents a horizontal coordinate of the point on the airfoil; $\Delta z_u = y_{u_{TE}}/c$, $\Delta z_l = y_{l_{TE}}/c$, $\Delta z_u$ represents a dimensionless trailing edge thickness of the upper airfoil surface of the airfoil; $\Delta z_l$ represents a dimensionless trailing edge thickness of the lower airfoil surface of the airfoil; $y_{u_{TE}}$ represents a vertical coordinate of a trailing edge point on the upper airfoil surface of the airfoil; $y_{l_{TE}}$ represents a vertical coordinate of a trailing edge point of the lower airfoil surface of the airfoil; $C(\zeta) = \zeta^{N1} \cdot (1-\zeta)^{N2}$; $C(\zeta)$ represents a class function; $N_1$ and $N_2$ are both constants; for a conventional airfoil with a rounded head and a pointed trailing edge, $N_1 = 0.5$, and $N_2 = 1$; $A_u^k$ represents a coefficient for controlling a profile of the upper airfoil surface of the airfoil; $A_l^k$ represents a coefficient for controlling a profile of the lower airfoil surface of the airfoil; k represents a coefficient number; n represents a total quantity of coefficients; $S_k(\zeta)$ represents a shape function, and a Bernstein polynomial is used as the shape function in this embodiment;

$$S_k(\zeta) = \frac{b!}{a!(b-k)!} \cdot \zeta^k \cdot (1-\zeta)^{b-k};$$

a represents a number of a polynomial; b represents an order of the polynomial; and a=0, 1, ..., b. Different geometric profiles of the airfoil can be obtained by adjusting values of the coefficients $A_u^k$ and $A_l^k$. Therefore, the coefficients $A_u^k$ and $A_l^k$ are used as design variables for optimization design of the airfoil, and are optimized to obtain an optimized airfoil profile satisfying a requirement. In this embodiment, a six-order Bernstein polynomial is used as the shape function. A coefficient of the polynomial is a design variable, and is optimized to obtain a new optimized airfoil.

The baseline airfoil, namely, an SC1095 airfoil, is fitted to obtain polynomial coefficients $A_u^k$ and $A_l^k$ of the airfoil, where k=0, 1, ..., 6. The sample point generated by the LHS method is used to obtain polynomial coefficients of a sample airfoil numbered j (the $j^{th}$ sample point $x_j^i$): $A_{uj}^k = f(A_{ui}^k, x_j^i)$ and $A_{lj}^k = f(A_{li}^k, x_j^i)$, where i represents the number of the variable, and f(g) represents a transformation function. The foregoing polynomial coefficients are substituted into the characterization equations of the upper and lower airfoil surfaces of the airfoil to obtain coordinates of all or most sample points.

Step S3: Perform dynamic characteristic simulation on the airfoil according to the characterization equations of the upper and lower airfoil surfaces by using a CFD method, to obtain a flow field characteristic of the airfoil, where the flow field characteristic includes a lift coefficient, a drag coefficient, and a moment coefficient.

In this step, the CFD method is used to perform dynamic characteristic simulation on the airfoil in the sample space. The following typical working condition of the airfoil is selected as a simulation condition: Ma=0.3+0.12 sin(ωt), α=10°−8° sin(ωt), k=0.069, and Re=3.75×10⁶, where Ma represents the Mach number, ω represents a circular frequency of airfoil oscillation, t represents physical time, k represents a reduced frequency, and Re represents the Reynolds number. Specifically:

31) Determine coordinates (ζ,ψ) of the sample point according to the characterization equations of the upper and lower airfoil surfaces.

32) Determine an initial grid, where the initial grid is generated based on the coordinates of the sample point.

33) Generate, based on the initial grid and by using a Poisson equation-based elliptic equation grid generation method, a C-shaped body-fitted grid around the airfoil, where the Poisson equation is as follows:

$$\begin{cases} \xi_{\zeta\zeta} + \xi_{\psi\psi} = P(\xi, \eta) \\ \eta_{\zeta\zeta} + \eta_{\psi\psi} = Q(\xi, \eta) \end{cases}$$

where (ξ,η) represents a point in a curvilinear coordinate system under a calculation plane, there is a mapping relationship between (ξ,η) and a point (ζ,η) in a linear coordinate system under a physical plane, $$\xi_{\zeta\zeta} = \frac{\partial^2 \xi}{\partial \zeta^2}, \xi_{\psi\psi} = \frac{\partial^2 \xi}{\partial \psi^2}, \eta_{\zeta\zeta} = \frac{\partial^2 \eta}{\partial \zeta^2}, \eta_{\psi\psi} = \frac{\partial^2 \eta}{\partial \psi^2},$$

Figure 2:
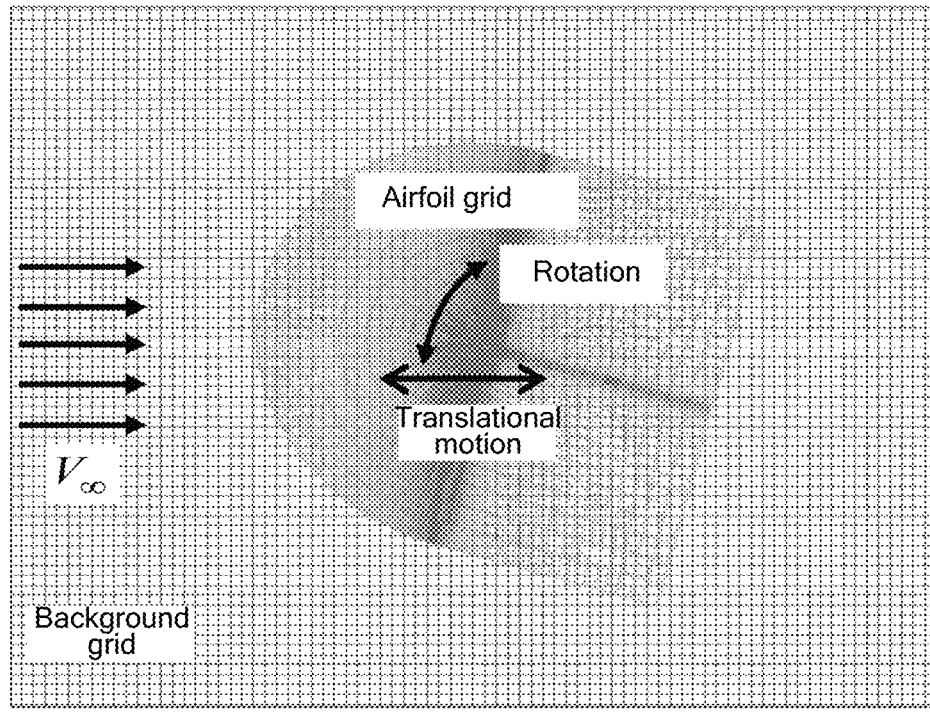
FIG. 2 is a schematic diagram of a moving embedded grid according to an embodiment of the present disclosure.

P(ξ,η) represents an orthogonality control function, and Q(ξ,η) represents a spacing control function. Grid orthogonality can be controlled by changing P(ξ,η), and grid spacing can be controlled by changing Q(ξ,η). The Poisson equation can be used to finally obtain the C-shaped body-fitted grid that is of the airfoil and whose orthogonality and spacing satisfy calculation requirements. In this embodiment, a moving embedded grid method is used. Rotation and translational motion are performed on the airfoil grid in a background grid to periodically change a velocity of an incoming flow and an angle of attack, as shown in FIG. 2.

34) In this embodiment, use a Reynolds-averaged Navier-Stokes (RANS) equation in integral form as a rotor flow field solving control equation, and when solving the control equation, read coordinates of a grid point of the airfoil first, and then calculate an area of a grid cell, a volume of the grid cell, and a normal vector of a grid cell surface. Therefore, in this step, an area and a volume of each grid cell in the C-shaped body-fitted grid are calculated.

35) Determine a fluid control equation (the RANS equation) in integral form in an inertial coordinate system based on the area, the volume, a conservative variable, a convective flux term, and a viscous flux term. The fluid control equation is as follows:

$$\frac{\partial}{\partial t}\iiint_\Omega W d\Omega + \iint_{\partial\Omega}(F_c - F_v)dS = 0$$

where t represents the physical time, $F_c$ represents the convective flux term, $F_v$ represents the viscous flux term, Ω represents the volume of the grid cell, S represents the area of the grid cell, W represents the conservative variable, $$W = \begin{bmatrix} \rho \\ \rho u \\ \rho v \\ \rho E \end{bmatrix}, F_c = \begin{bmatrix} \rho V_r \\ \rho u V_r + n_x p \\ \rho v V_r + n_y p \\ \rho H V_r + V_t p \end{bmatrix}, F_v = \begin{bmatrix} 0 \\ n_x \tau_{xx} + n_y \tau_{xy} \\ n_x \tau_{yx} + n_y \tau_{yy} \\ n_x \Theta_x + n_y \Theta_y \end{bmatrix},$$

ρ represents air density, E represents total energy, H represents total enthalpy, p represents pressure, u represents a velocity component in an x-axis direction, v represents a velocity component in a y-axis direction, $V_r$ represents a velocity of relative motion, $V_t$ represents a grid moving velocity, $(n_x, n_y)$ represents a unit normal vector of the grid cell surface, $\tau_{xx}$ represents a viscous stress component acting on a plane perpendicular to an x axis and along the x-axis direction, $\tau_{xy}$ represents a viscous stress component acting on the plane perpendicular to the x axis and along the y-axis direction, $\tau_{yy}$ represents a viscous stress component acting on a plane perpendicular to a Y axis and along the y-axis direction, $\Theta_x$ represents a viscous stress term, and $\Theta_y$ represents a heat conduction term.

36) Solve the fluid control equation, where a solution of the fluid control equation is $$W = \begin{bmatrix} \rho \\ \rho u \\ \rho v \\ \rho E \end{bmatrix}.$$

The flow field characteristic of the airfoil is calculated based on the solution of the fluid control equation.

Step S4: Establish a mapping relationship between the sample point and the flow field characteristic by using a Kriging model, and train the mapping relationship by using a maximum likelihood estimation method and an EI criterion, to obtain a trained mapping relationship. The step S4 specifically includes the following substeps.

41) Use the Kriging model to establish the mapping relationship between the sample point and the flow field characteristic, in other words, a mapping relationship between $x_j^i$ and each of the lift coefficient Cl, the drag coefficient Cd, and the moment coefficient Cm. Based on the Kriging model, predicted values $\hat{C}l, \hat{C}d, \hat{C}m$ of the lift coefficient, the drag coefficient, and the moment coefficient at an unknown point x may be represented as a linear sample point combination:

$$\hat{C}l(x) = r_l^T R_l^{-1} Y_l - (F^T R_l^{-1} r_l - f)^T (F^T R_l^{-1} F)^{-1} F^T R_l^{-1} Y_l,$$

$$\hat{C}d(x) = r_d^T R_d^{-1} Y_d - (F^T R_d^{-1} r_d - f)^T (F^T R_d^{-1} F)^{-1} F^T R_d^{-1} Y_d,$$

$$\hat{C}m(x) = r_m^T R_m^{-1} Y_m - (F^T R_m^{-1} r_m - f)^T (F^T R_m^{-1} F)^{-1} F^T R_m^{-1} Y_m,$$

where $\hat{C}l$ represents the predicted value of the lift coefficient, $\hat{C}d$ represents the predicted value of the drag coefficient, $\hat{C}m$ represents the predicted value of the moment coefficient, $Y_l$ represents a vector constituted by lift coefficients Cl corresponding to sample points, $Y_d$ represents a vector constituted by drag coefficients Cd corresponding to the sample points, $Y_m$ represents a vector constituted by moment coefficients Cm corresponding to the sample points, $Y_l = [Cl_1, Cl_2, L\, Cl_{ns}]^T$, $Y_d = [Cd_1, Cd_2\, L\, Cd_{ns}]^T$, $Y_m = [Cm_1\, Cm_2\, L\, Cm_{ns}]^T$, ns represents a quantity of the sample points, $$f = \begin{bmatrix} f_1(x) \\ M \\ f_p(x) \end{bmatrix}, F = \begin{bmatrix} f_1(x_1) & L & f_p(x_1) \\ M & O & M \\ f_1(x_{ns}) & L & f_p(x_{ns}) \end{bmatrix},$$

$f_1(g)$, K $f_p(g)$ represents a known polynomial function, $x_1$, $x_2$, and $x_{ns}$ are all vectors constituted by sample points $x_j^i$, $x_1 = [x_1^1\, x_1^2\, K\, x_1^e]$, $x_2 = [x_2^1\, x_2^2\, K\, x_2^e]$, $x_{ns} = [x_{ns}^1\, x_{ns}^2\, K\, x_{ns}^e]$, e represents a vector dimension, i represents the number of the variable, j represents a number of the sample point, $$R_l = \begin{bmatrix} R_l(x_1, x_1) & L & R_l(x_1, x_{ns}) \\ M & O & M \\ R_l(x_{ns}, x_1) & L & R_l(x_{ns}, x_{ns}) \end{bmatrix}, r_l = \begin{bmatrix} R_l(x, x_1) \\ R_l(x, x_2) \\ M \\ R_l(x, x_{ns}) \end{bmatrix},$$

$$R_l(x_{j1}, x_{j2}) = \prod_{i=1}^{n} (-\theta_{li}|x_{j1}^i - x_{j2}^i|)^{p_{li}},$$

$\theta_{li}$ and $p_{li}$ represent unknown parameters corresponding to the lift coefficient, $\theta_{li}$ and $p_{li}$ are obtained by calculating $$\max\left(-\frac{ns}{2}\ln\left(\frac{(Y_l - F\hat{\beta}_l)^T R_l^{-1}(Y_l - F\hat{\beta}_l)}{n_s}\right) - \frac{1}{2}\ln[|R_l|]\right),$$

$$\hat{\beta}_l = (F^T R_l^{-1} F)^{-1} F^T R_l^{-1} Y_l, R_d = \begin{bmatrix} R_d(x_1, x_1) & L & R_d(x_1, x_{ns}) \\ M & O & M \\ R_d(x_{ns}, x_1) & L & R_d(x_{ns}, x_{ns}) \end{bmatrix},$$

$$r_d = \begin{bmatrix} R_d(x, x_1) \\ R_d(x, x_2) \\ M \\ R_d(x, x_{ns}) \end{bmatrix}, R_d(x_{j1}, x_{j2}) = \prod_{i=1}^{n} (-\theta_{di}|x_{j1}^i - x_{j2}^i|)^{p_{di}},$$

$\theta_{di}$ and $p_{di}$ represent unknown parameters corresponding to the drag coefficient, $\theta_{di}$ and $p_{di}$ are obtained by calculating $$\max\left(-\frac{n_s}{2}\ln\left(\frac{(Y_d - F\hat{\beta}_d)^T R_d^{-1}(Y_d - F\hat{\beta}_d)}{n_s}\right) - \frac{1}{2}\ln[|R_d|]\right),$$

$$\hat{\beta}_d = (F^T R_d^{-1} F)^{-1} F^T R_d^{-1} Y_d, R_m = \begin{bmatrix} R_m(x_1, x_1) & L & R_m(x_1, x_{ns}) \\ M & O & M \\ R_m(x_{ns}, x_1) & L & R_m(x_{ns}, x_{ns}) \end{bmatrix},$$

$$r_m = \begin{bmatrix} R_m(x, x_1) \\ R_m(x, x_2) \\ M \\ R_m(x, x_{ns}) \end{bmatrix}, R_m(x_{j1}, x_{j2}) = \prod_{i=1}^{n} (-\theta_{mi}|x_{j1}^i - x_{j2}^i|)^{p_{mi}},$$

$\theta_{mi}$ and $p_{mi}$ represent unknown parameters corresponding to the moment coefficient, $\theta_{mi}$ and $p_{mi}$ are obtained by calculating $$\max\left(-\frac{n_s}{2}\ln\left(\frac{(Y_m - F\hat{\beta}_m)^T R_m^{-1}(Y_d - F\hat{\beta}_m)}{n_s}\right) - \frac{1}{2}\ln[|R_m|]\right),$$

and $\hat{\beta}_m = (F^T R_m^{-1} F)^{-1} F^T R_m^{-1} Y_m$.

42) Determine an unknown parameter in the mapping relationship by using the maximum likelihood estimation method, to obtain the trained mapping relationship.

43) Improve the trained mapping relationship by using the EI criterion, to obtain the trained mapping relationship.

Specifically, to improve prediction precision of the model, the EI criterion is used to find a new sample point with a maximum value of a mathematical expectation and a new sample point with an optimal objective function value in a process of training the Kriging model, and the two new sample points are used for training optimization of the model, till a convergence condition is satisfied. $\hat{C}l(x)$ is used as an example, and $\hat{C}d(x)$ and $\hat{C}m(x)$ are similar to $\hat{C}l(x)$. In the EI criterion, it is assumed that $\hat{C}l(x)$ of any prediction point x is characterized by normal random distribution, in other words, satisfies $\hat{C}l(x) \sim N(\mu, s^2)$, where $\mu$ represents an average predicted value, and s represents a standard deviation. In calculation space, a mathematical expectation of any point can be calculated according to the following formula:

$$E[I(x)] = \begin{cases} (\hat{C}l_{min} - \hat{C}l(x))\Phi\left(\frac{\hat{C}l_{min} - \hat{C}l(x)}{s}\right) + s(x)\phi\left(\frac{\hat{C}l_{min} - \hat{C}l(x)}{s}\right) & s > 0 \\ 0 & s = 0 \end{cases}$$

where $\hat{C}l_{min}$ represents a minimum value of the sample point, $\Phi$ represents a standard normal distribution function, and $\phi$ represents a density function of normal distribution. When a maximum value of the mathematical expectation $E[I(x)]$ is found, a point with a relatively small predicted value or a point with relatively low prediction precision of the model can be found. In each interpolation process, an optimal improved point x can always in this particular embodiment be found. A specific process is as follows: (1) Substitute x into a CST formula to generate a new airfoil. (2) Generate a grid. (3) Calculate dynamic characteristics. (4) Add related data of the airfoil to the sample airfoil space, to re-establish the Kriging model. (5) Train the Kriging model by using the EI criterion, to obtain the optimal improved point x. Repeat the steps (1) to (5) till prediction precision of a surrogate model satisfies a requirement, so that the mapping relationship between $x_j^i$ and Cl,Cd,Cm is established.

Step S5: Determine an optimal sample point based on the trained mapping relationship by using NSGA-II. The optimal sample point corresponds to an optimal flow field characteristic, and the optimal flow field characteristic includes an optimal lift coefficient, an optimal drag coefficient, and an optimal moment coefficient.

The step S5 specifically includes the following substeps:

501) Randomly generate an initial population whose scale is N.

502) Calculate, by using the trained mapping relationship, a lift coefficient, a drag coefficient, and a moment coefficient that correspond to each individual in a current-generation population.

503) Perform fast non-dominated sorting on all or most individuals in the current-generation population based on the lift coefficient, the drag coefficient, and the moment coefficient that correspond to each individual in the current-generation population, and obtain a current-generation parent population by performing selection, crossover, and mutation based on a genetic algorithm, where a quantity of population generations is equal to a quantity of iterations of the genetic algorithm.

504) Calculate, by using the trained mapping relationship, a lift coefficient, a drag coefficient, and a moment coefficient that correspond to each individual in the current-generation parent population.

505) Perform fast non-dominated sorting on all or most individuals in the current-generation parent population based on the lift coefficient, the drag coefficient, and the moment coefficient that correspond to each individual in the current-generation parent population, and obtain a current-generation child population by performing selection, crossover, and mutation based on the genetic algorithm.

506) Combine the current-generation parent population and the current-generation child population to obtain a combined current-generation population.

507) Calculate, by using the trained mapping relationship, a lift coefficient, a drag coefficient, and a moment coefficient that correspond to each individual in the combined current-generation population.

508) Perform fast non-dominated sorting on all or most individuals in the combined current-generation population based on the lift coefficient, the drag coefficient, and the moment coefficient that correspond to each individual in the combined current-generation population, and calculate an individual crowdedness degree in each non-dominated layer.

509) Select, from the combined current-generation population based on a result of fast non-dominated sorting and the individual crowdedness degree, an individual that satisfies a preset condition, to constitute a next-generation parent population.

510) Determine whether a sequence number of a generation to which the next-generation parent population belongs is equal to a preset maximum quantity of iterations. If the sequence number of the generation to which the next-generation parent population belongs is not equal to the preset maximum quantity of iterations, the next-generation parent population is used as a current-generation parent population, and the step 504) is performed to calculate, by using the trained mapping relationship, a lift coefficient, a drag coefficient, and a moment coefficient that correspond to each individual in the current-generation parent population. If the sequence number of the generation to which the next-generation parent population belongs is equal to the preset maximum quantity of iterations, an individual in the next-generation parent population is determined as the optimal sample point.

Figure 3:
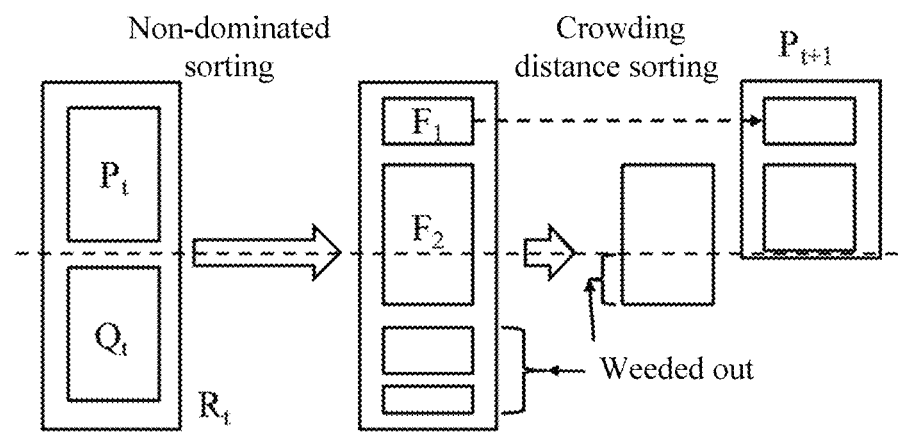
FIG. 3 is a flowchart of NSGA-II-based calculation according to an embodiment of the present disclosure.

Refer to FIG. 3. Based on the foregoing ideas, a specific process of finding an optimal airfoil by using NSGA-II is as follows: (1) Randomly generate an initial population $x_1, x_2, K\ x_N$ whose scale is N. (2) Calculate Cl,Cd,Cm of each individual in the population by using the mapping relationship established based on the Kriging model. (3) Perform non-dominated sorting on an individual in the population based on values of Cl,Cd,Cm, and obtain the first-generation parent population $x_1^1, x_2^1, K, x_N^1$ by performing selection, crossover, and mutation based on the genetic algorithm. (4) Repeat the steps (2) and (3) to obtain the second-generation child population $x_1^2, x_2^3, K, x_N^2$. (5) Combine the parent population and the child population. (6) Calculate Cl,Cd,Cm of each individual in a combined population by using the mapping relationship established based on the Kriging model. (7) Perform fast non-dominated sorting based on Cl, Cd, Cm, and calculate an individual crowdedness degree in each non-dominated layer. (8) Select a proper individual based on a non-dominated relationship and the individual crowdedness degree, to constitute a new parent population $(x_1^{it}, x_2^{it}, K, x_N^{it})$. (9) Repeat the steps (2) and (3) to obtain a new child population $x_1^{it+1}, x_2^{it+1}, K, x_N^{it+1}$. (10) Repeat the steps (5) to (9), till a quantity of iterations reaches a preset value and a final optimal sample point is obtained.

Step S6: Determining a rotor airfoil based on the optimal sample point.

In actual application, the optimized airfoil finally obtained by performing the steps S1 to S6 is characterized by a large leading edge radius on an upper airfoil surface, a flat transition part from 0.2c to 0.4c on the upper surface, a concave lower surface, and a slightly upturned trailing edge. The optimized airfoil is manufactured based on data provided in Table 1 A chord length of the airfoil is 1.

TABLE 1

Data of the optimized airfoil

| Sequence number of a coordinate point on the lower airfoil surface | Horizontal coordinate (x/c) on the lower airfoil surface | Vertical coordinate (y/c) on the lower airfoil surface | Sequence number of a coordinate point on the upper airfoil surface | Horizontal coordinate (x/c) on the upper airfoil surface | Vertical coordinate (y/c) on the upper airfoil surface |
|---|---|---|---|---|---|
| 1 | 1.00000 | 0.00000 | 1 | 1.00000 | 0.00000 |
| 2 | 0.99017 | −0.00179 | 2 | 0.99008 | 0.00047 |
| 3 | 0.97206 | −0.00458 | 3 | 0.97142 | 0.00007 |
| 4 | 0.94635 | −0.00766 | 4 | 0.94499 | 0.00320 |
| 5 | 0.91376 | −0.01057 | 5 | 0.91183 | 0.00961 |
| 6 | 0.87506 | −0.01315 | 6 | 0.87275 | 0.01872 |
| 7 | 0.83104 | −0.01537 | 7 | 0.82834 | 0.02946 |
| 8 | 0.78244 | −0.01709 | 8 | 0.77916 | 0.04073 |
| 9 | 0.73002 | −0.01807 | 9 | 0.72585 | 0.05173 |
| 10 | 0.67457 | −0.01811 | 10 | 0.66915 | 0.06189 |
| 11 | 0.61685 | −0.01723 | 11 | 0.60982 | 0.07079 |

TABLE 1-continued

Data of the optimized airfoil

| Sequence number of a coordinate point on the lower airfoil surface | Horizontal coordinate (x/c) on the lower airfoil surface | Vertical coordinate (y/c) on the lower airfoil surface | Sequence number of a coordinate point on the upper airfoil surface | Horizontal coordinate (x/c) on the upper airfoil surface | Vertical coordinate (y/c) on the upper airfoil surface |
|---|---|---|---|---|---|
| 12 | 0.55762 | −0.01584 | 12 | 0.54867 | 0.07794 |
| 13 | 0.49762 | −0.01455 | 13 | 0.48649 | 0.08296 |
| 14 | 0.43761 | −0.01395 | 14 | 0.42418 | 0.08588 |
| 15 | 0.37835 | −0.01434 | 15 | 0.36260 | 0.08733 |
| 16 | 0.32061 | −0.01561 | 16 | 0.30259 | 0.08818 |
| 17 | 0.26515 | −0.01736 | 17 | 0.24493 | 0.08891 |
| 18 | 0.21272 | −0.01914 | 18 | 0.19043 | 0.08895 |
| 19 | 0.16407 | −0.02060 | 19 | 0.13994 | 0.08651 |
| 20 | 0.11994 | −0.02148 | 20 | 0.09471 | 0.07929 |
| 21 | 0.08109 | −0.02144 | 21 | 0.05669 | 0.06610 |
| 22 | 0.04834 | −0.01991 | 22 | 0.02789 | 0.04813 |
| 23 | 0.02268 | −0.01599 | 23 | 0.00957 | 0.02849 |
| 24 | 0.00577 | −0.00900 | 24 | 0.00154 | 0.01129 |
| 25 | 0.00011 | −0.00100 | 25 | 0.00005 | 0.00099 |
| 26 | 0.00000 | 0.00000 | 26 | 0.00000 | 0.00000 |

Figure 4:
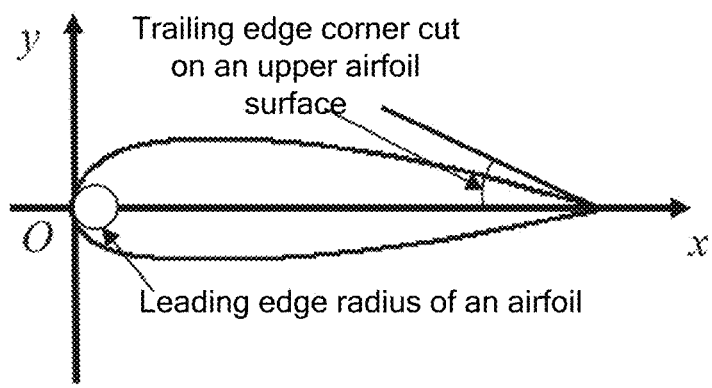
FIG. 4 is a schematic diagram of a coordinate system and a profile of an airfoil according to an embodiment of the present disclosure.
Figure 5:
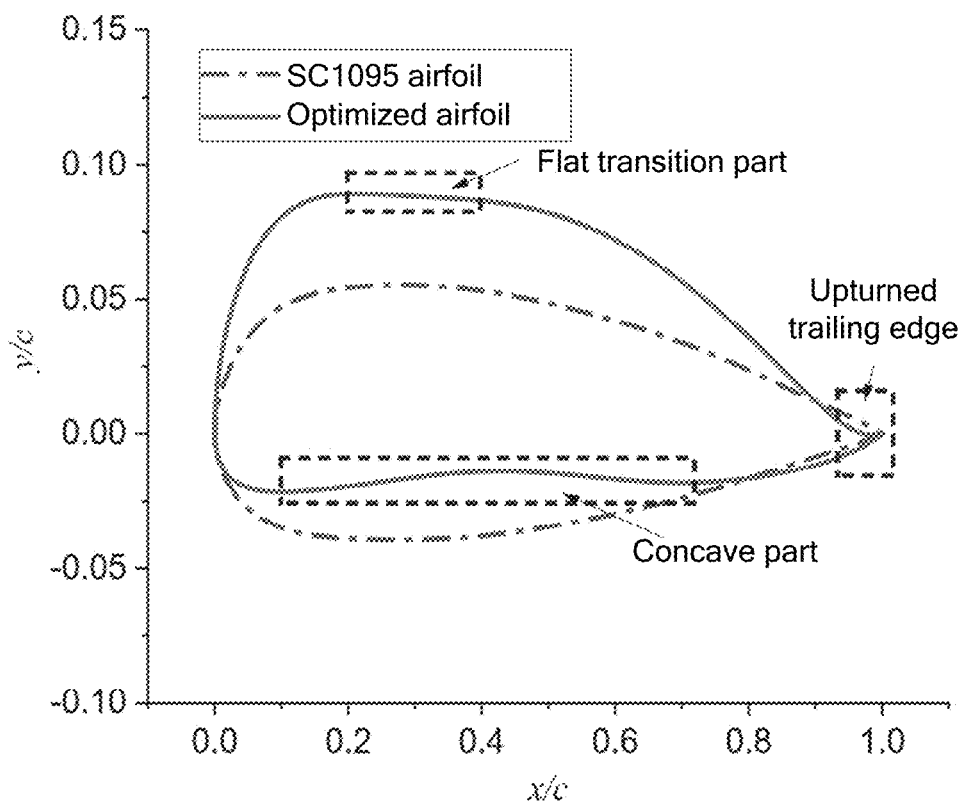
FIG. 5 compares an SC1095 airfoil and an optimized airfoil.
Figure 6:
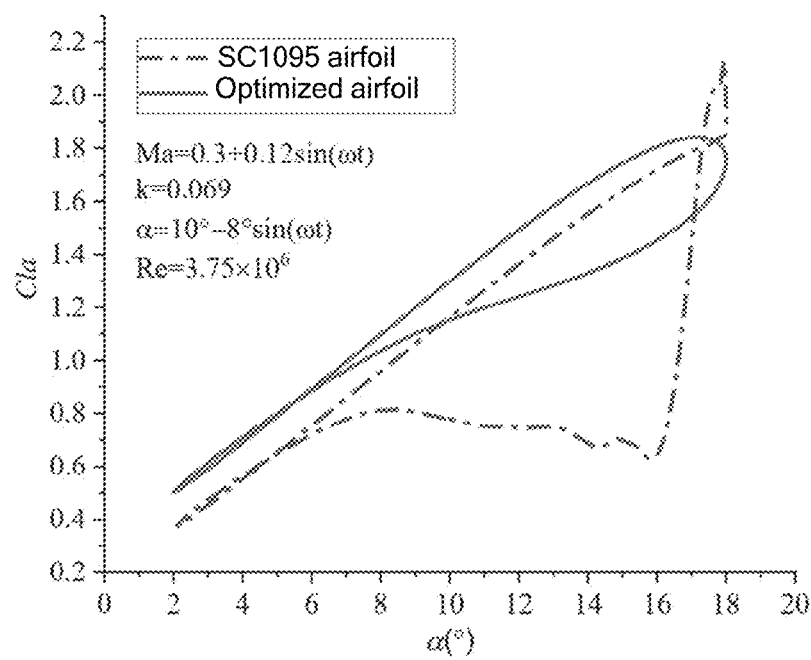
FIG. 6 compares lift coefficients of an SC1095 airfoil and an optimized airfoil.
Figure 7:
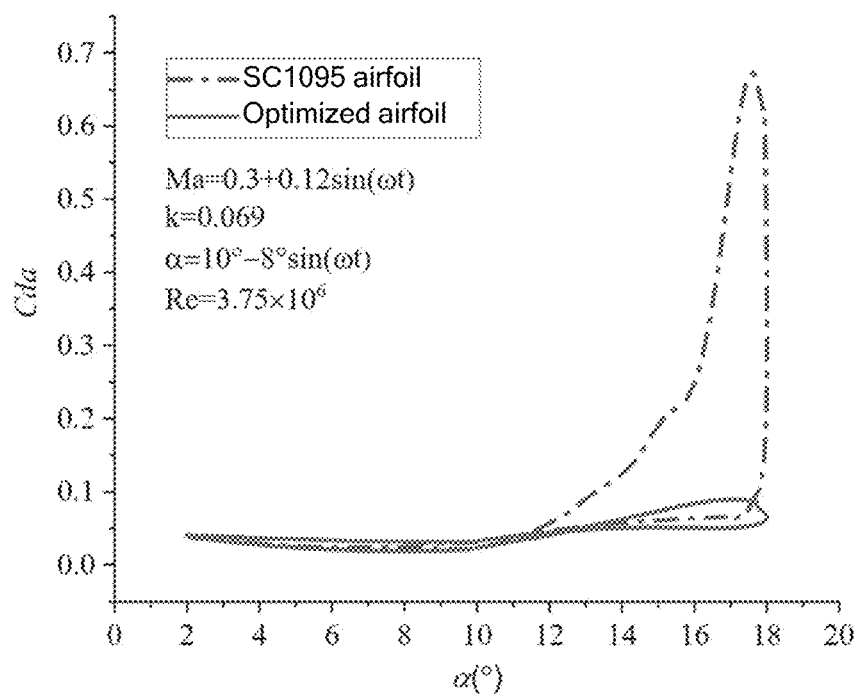
FIG. 7 compares drag coefficients of an SC1095 airfoil and an optimized airfoil.
Figure 8:
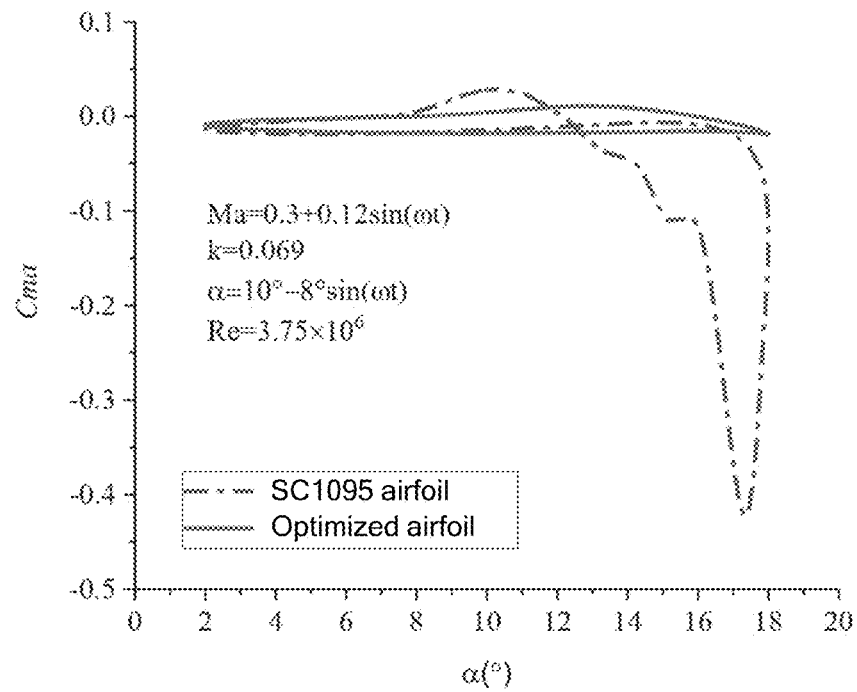
FIG. 8 compares moment coefficients of an SC1095 airfoil and an optimized airfoil.
Figure 9:
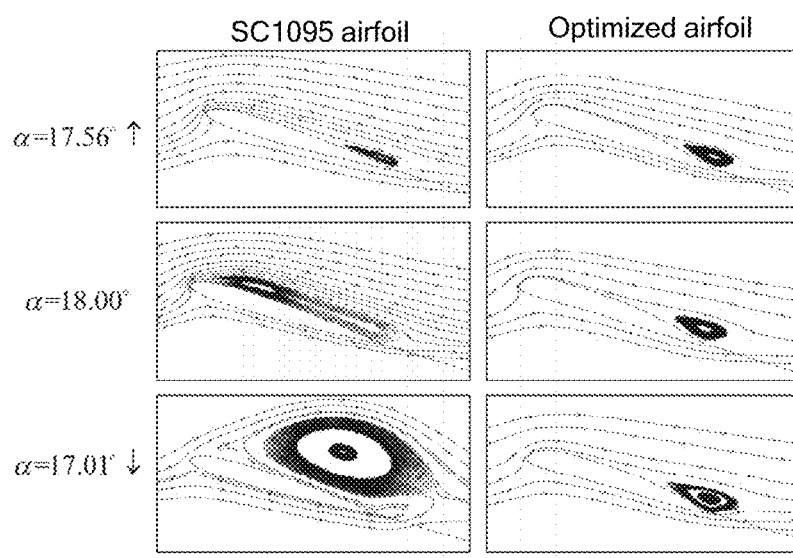
FIG. 9 compares streamline charts of an SC1095 airfoil and an optimized airfoil.
Figure 10:
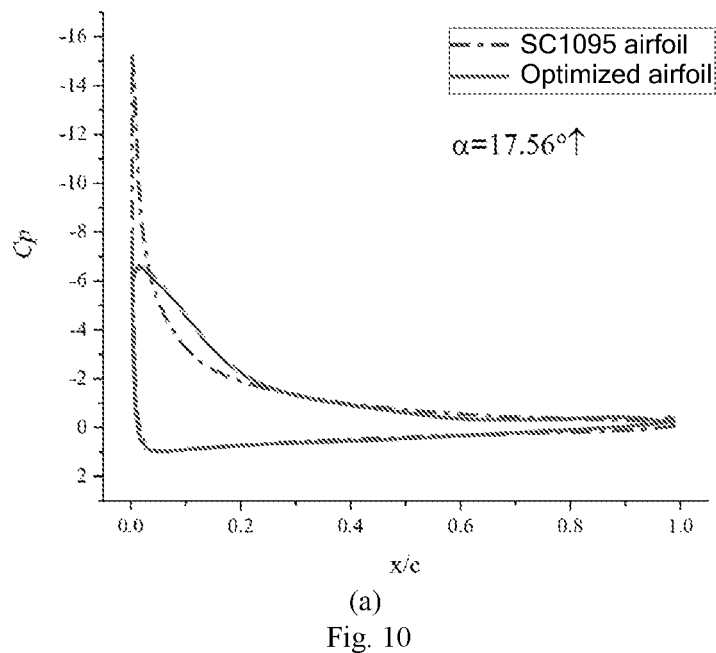
FIG. 10 compares pressure coefficient distribution curves of an SC1095 airfoil and an optimized airfoil.
Figure 10:
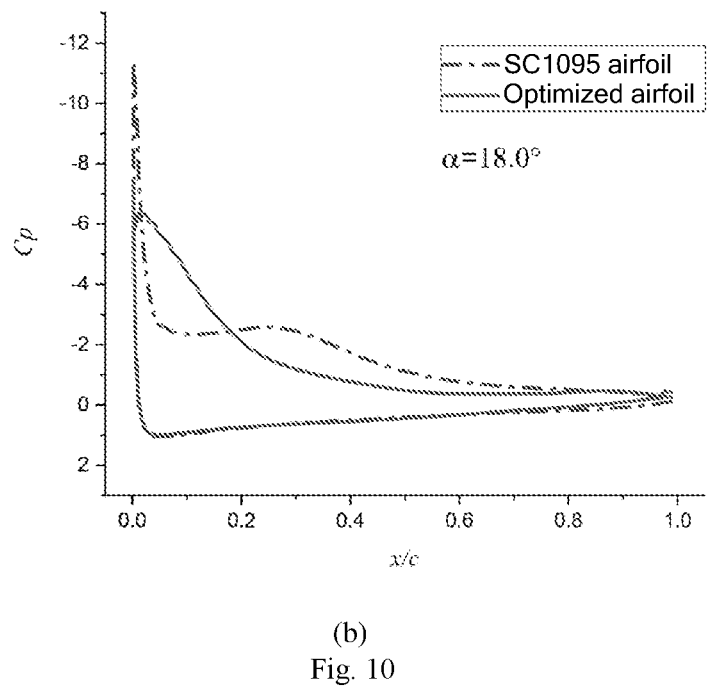
Figure 10:
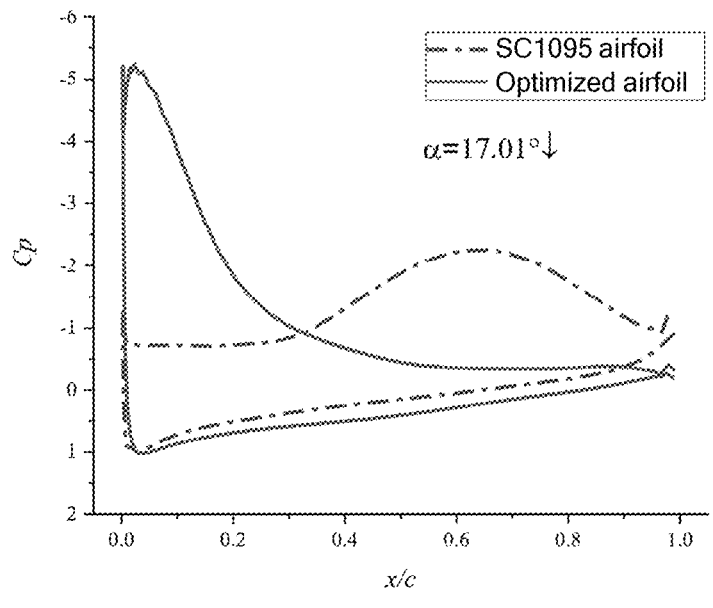

A coordinate system and a profile of the airfoil are shown in FIG. 4. FIG. 5 compares an SC1095 airfoil and the optimized airfoil. It can be learned from FIG. 5 that the optimized airfoil has a larger camber, the leading edging radius on the upper airfoil surface of the optimized airfoil is obviously larger than that of the SC1095 airfoil, the flat transition part is available in the middle of the upper surface of the optimized airfoil, and the optimized airfoil is characterized by the concave lower surface and the slightly upturned trailing edge. FIG. 6 to FIG. 8 compare aerodynamic characteristics of the two airfoils in a coupled condition with a changing incoming flow and a changing angle of attack. It can be learned from FIG. 6 to FIG. 8 that, compared with the SC1095 airfoil, the optimized airfoil has been greatly improved in drag and moment characteristics, thereby alleviating drag divergence and moment divergence. In addition, an area of a lift coefficient hysteresis loop of the optimized airfoil is remarkably reduced, and this indicates that the optimized airfoil can effectively improve dynamic aerodynamic characteristics of the airfoil in a rotor environment and suppress dynamic stall. FIG. 9 to FIG. 10 compare flow field characteristics of the two airfoils under three angles of attack in the coupled condition with the changing incoming flow and the changing angle of attack. It can be learned from FIG. 9 to FIG. 10 that, when the angle of attack ($\alpha$) is 17.56° in a pitching-up process, for both the SC1095 airfoil and the optimized airfoil, a vortex is generated near a trailing edge, and a streamline attaches an airfoil surface at a leading edge and in the middle. As the angle of attack increases to 18.00°, a vortex is generated at the leading edge of the SC1095 airfoil. In addition, as the airfoil pitches down, the leading edge vortex is enhanced and gradually moves to the trailing edge until it sheds from the airfoil surface. For the optimized airfoil, an adverse pressure gradient of the leading edge is alleviated by changing the profile of the optimized airfoil, thereby suppressing the leading edge vortex. Therefore, the optimized airfoil has better dynamic characteristics.

Compared with the SC1095 airfoil, the optimized airfoil has a better dynamic stall characteristic. Reasons are as follows: (1) The optimized airfoil has a larger leading edge radius on the upper airfoil surface, and this can effectively alleviate the adverse pressure gradient of the leading edge of the airfoil (the optimized airfoil has a smaller peak negative pressure value at the leading edge, as shown in FIG. 10 (a) and FIG. 10 (b)), and weaken strength of the leading edge vortex and even suppress the leading edge vortex (streamline, as shown in FIG. 9), thereby alleviating and even avoiding a sharp drop in lift and divergence of drag and moments when the leading edge vortex moves or falls off. (2) The flat transition part from a position 0.2c to a position 0.4c is available on the upper surface of the optimized airfoil, and this can postpone drag divergence and moment divergence. (3) Positions 0.1c to 0.7c on the lower surface of the optimized airfoil are concave, increasing the camber of the airfoil and improving the lift of the airfoil. (4) The trailing edge of the optimized airfoil is slightly upturned, and this can postpone drag divergence and moment divergence, and can improve a reattaching characteristic of an airflow in the case of a large angle of attack.

According to the method for determining a helicopter rotor airfoil in this embodiment, in the condition with the changing incoming flow and the changing angle of attack, the leading edge vortex is suppressed in the entire motion process, and the vortex is generated near the trailing edge in the case of the large angle of attack. In this way, the lift, the drag, and the moment of the airfoil are no longer affected by moving or shedding of the leading edge vortex in the dynamic stall process.

Figure 11:
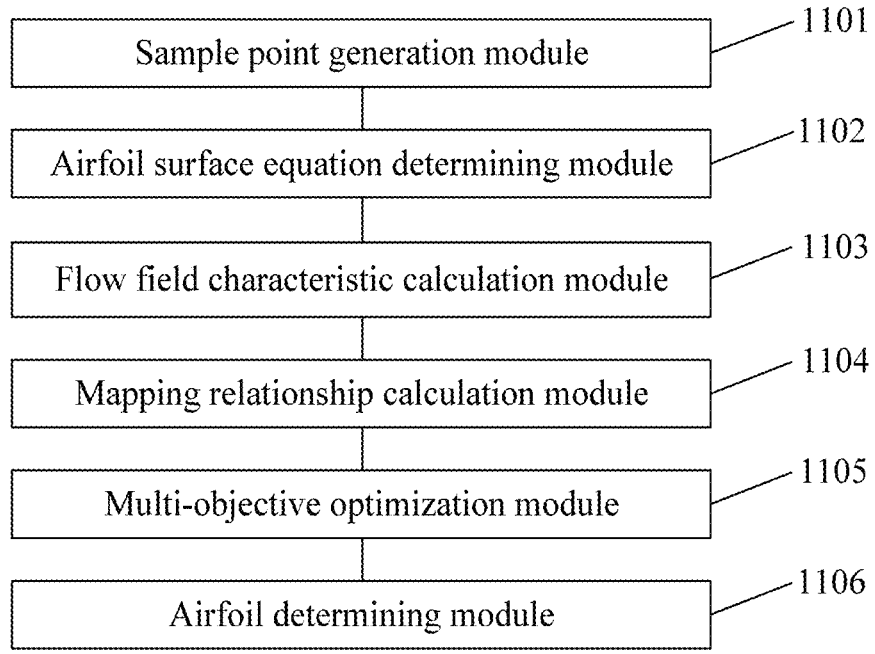
FIG. 11 is a schematic structural diagram of a system for determining a helicopter rotor airfoil according to an embodiment of the present disclosure.

The present disclosure further provides a system for determining a helicopter rotor airfoil. FIG. 11 is a schematic structural diagram of a system for determining a helicopter rotor airfoil according to an embodiment of the present disclosure. Refer to FIG. 11. The system for determining a helicopter rotor airfoil in this embodiment includes a sample point generation module 1101, an airfoil surface equation determining module 1102, a flow field characteristic calculation module 1103, a mapping relationship calculation module 1104, a multi-objective optimization module 1105, and an airfoil determining module 1106.

The sample point generation module 1101 is configured to randomly generate a sample point by using an LHS method.

The airfoil surface equation determining module 1102 is configured to determine characterization equations of upper and lower airfoil surfaces of an airfoil based on the sample point by using a CST method.

The flow field characteristic calculation module 1103 is configured to perform dynamic characteristic simulation on the airfoil according to the characterization equations of the upper and lower airfoil surfaces by using a CFD method, to obtain a flow field characteristic of the airfoil, where the flow field characteristic includes a lift coefficient, a drag coefficient, and a moment coefficient.

The mapping relationship calculation module 1104 is configured to establish a mapping relationship between the sample point and the flow field characteristic by using a Kriging model, and train the mapping relationship by using a maximum likelihood estimation method and an EI criterion, to obtain a trained mapping relationship.

The multi-objective optimization module 1105 is configured to determine an optimal sample point based on the trained mapping relationship by using NSGA-II, where the optimal sample point corresponds to an optimal flow field characteristic, and the optimal flow field characteristic includes an optimal lift coefficient, an optimal drag coefficient, and an optimal moment coefficient.

The airfoil determining module 1106 is configured to determine a rotor airfoil based on the optimal sample point.

Each embodiment in this specification is described in a progressive manner, each embodiment focuses on the difference from other embodiments, and the same and similar parts between the embodiments may refer to each other. For the system disclosed in the embodiments, since the system corresponds to the method disclosed in the embodiments, the system is simply described, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation on the present disclosure.

What is claimed is:

1. A method for determining a helicopter rotor airfoil, the method comprising:
   randomly generating a sample point by using a Latin hypercube sampling (LHS) method;
   determining characterization equations of upper and lower airfoil surfaces of an airfoil based on the sample point by using a class shape transformation (CST) method;
   performing dynamic characteristic simulation on the airfoil according to the characterization equations of the upper and lower airfoil surfaces by using a computational fluid dynamics (CFD) method, to obtain a flow field characteristic of the airfoil, wherein the flow field characteristic comprises a lift coefficient, a drag coefficient, and a moment coefficient;
   establishing a mapping relationship between the sample point and the flow field characteristic by using a Kriging model, and training the mapping relationship by using a maximum likelihood estimation method and an expected improvement (EI) criterion, to obtain a trained mapping relationship;
   determining an optimal sample point based on the trained mapping relationship by using Non-dominated Sorting Genetic Algorithm II (NSGA-II), wherein the optimal sample point corresponds to an optimal flow field characteristic, and the optimal flow field characteristic comprises an optimal lift coefficient, an optimal drag coefficient, and an optimal moment coefficient; and
   determining a shape of a rotor airfoil based on the optimal sample point.

2. The method for determining a helicopter rotor airfoil according to claim 1, wherein the characterization equations of the upper and lower airfoil surfaces are as follows:

$$\begin{cases} \psi_u(\zeta) = C(\zeta) \cdot \sum_{k=0}^{n} A_u^k \cdot S_k(\zeta) + \zeta \cdot \Delta z_u \\ \psi_l(\zeta) = C(\zeta) \cdot \sum_{k=0}^{n} A_l^k \cdot S_k(\zeta) + \zeta \cdot \Delta z_l \end{cases}$$

wherein $\psi_u = y_u/c$, $\psi_l = y_l/c$; $\psi_u$ represents a dimensionless vertical coordinate of a point on the upper airfoil surface of the airfoil; $\psi_l$ represents a dimensionless vertical coordinate of a point on the lower airfoil surface of the airfoil; $y_u$ represents a vertical coordinate of the point on the upper airfoil surface of the airfoil; $y_l$ represents a vertical coordinate of the point on the lower airfoil surface of the airfoil; c represents a chord length of the airfoil; $\zeta = x/c$; $\zeta$ represents a dimensionless horizontal coordinate of a point on the airfoil; x represents a horizontal coordinate of the point on the airfoil; $\Delta z_u = y_{u_{TE}}/c$, $\Delta z_l = y_{l_{TE}}/c$; $\Delta z_u$ represents a dimensionless trailing edge thickness of the upper airfoil surface of the airfoil; $\Delta z_l$ represents a dimensionless trailing edge thickness of the lower airfoil surface of the airfoil; $y_{u_{TE}}$ represents a vertical coordinate of a trailing edge point on the upper airfoil surface of the airfoil; $y_{l_{TE}}$ represents a vertical coordinate of a trailing edge point on the lower airfoil surface of the airfoil; $C(\zeta) = \zeta^{N_1} \cdot (1-\zeta)^{N_2}$; $C(\zeta)$ represents a class function; $N_1$ and $N_2$ are both constants; $A_u^k$ represents a coefficient for controlling a profile of the upper airfoil surface of the airfoil; $A_l^k$ represents a coefficient for controlling a profile of the lower airfoil surface of the airfoil; k represents a coefficient number; for the $j^{th}$ sample point $x_j^i$, $A_{uj}^k = f(A_{ui}^k, x_j^i)$, $A_{lj}^k = f(A_{li}^k, x_j^i)$, i represents a number of the variable, and f(•) represents a transformation function; n represents a total quantity of coefficients; $S_k(\zeta)$ represents a shape function;

$$S_k(\zeta) = \frac{b!}{a!(b-k)!} \cdot \zeta^k \cdot (1-\zeta)^{b-k};$$

a represents a number of a polynomial; b represents an order of the polynomial; and a=0, 1, . . . , b.

3. The method for determining a helicopter rotor airfoil according to claim 1, wherein the performing dynamic characteristic simulation on the airfoil according to the characterization equations of the upper and lower airfoil surfaces by using a CFD method, to obtain a flow field characteristic of the airfoil specifically comprises:
   determining coordinates of the sample point according to the characterization equations of the upper and lower airfoil surfaces;
   determining an initial grid, wherein the initial grid is generated based on the coordinates of the sample point;
   generating, based on the initial grid and by using a Poisson equation-based elliptic equation grid generation method, a C-shaped body-fitted grid around the airfoil, wherein the Poisson equation is as follows:

$$\begin{cases} \xi_{\zeta\zeta} + \xi_{\psi\psi} = P(\xi, \eta) \\ \eta_{\zeta\zeta} + \eta_{\psi\psi} = Q(\xi, \eta) \end{cases}$$

wherein $(\xi, \eta)$ represents a point in a curvilinear coordinate system under a calculation plane, there is a mapping relationship between $(\xi, \eta)$ and a point $(\zeta, \psi)$ in a linear coordinate system under a physical plane, $$\xi_{\zeta\zeta} = \frac{\partial^2 \xi}{\partial \zeta^2}, \xi_{\psi\psi} = \frac{\partial^2 \xi}{\partial \psi^2}, \eta_{\zeta\zeta} = \frac{\partial^2 \eta}{\partial \zeta^2}, \eta_{\psi\psi} = \frac{\partial^2 \eta}{\partial \psi^2},$$

$P(\xi, \eta)$ represents an orthogonality control function, and $Q(\xi, \eta)$ represents a spacing control function;

calculating an area and a volume of each grid cell in the C-shaped body-fitted grid;

determining a fluid control equation based on the area, the volume, a conservative variable, a convective flux term, and a viscous flux term, wherein the fluid control equation is as follows:

$$\frac{\partial}{\partial t} \int\int\int_\Omega W d\Omega + \int\int_{\partial\Omega} (F_c - F_v) dS = 0$$

wherein t represents physical time, $F_c$ represents the convective flux term, $F_v$ represents the viscous flux term, $\Omega$ represents the volume of the grid cell, S represents the area of the grid cell, W represents the conservative variable, $$W = \begin{bmatrix} \rho \\ \rho u \\ \rho v \\ \rho E \end{bmatrix}, F_c = \begin{bmatrix} \rho V_r \\ \rho u V_r + n_x p \\ \rho v V_r + n_y p \\ \rho H V_r + V_t p \end{bmatrix}, F_v = \begin{bmatrix} 0 \\ n_x \tau_{xx} + n_y \tau_{xy} \\ n_x \tau_{yx} + n_y \tau_{yy} \\ n_x \Theta_x + n_y \Theta_y \end{bmatrix},$$

$\rho$ represents air density, E represents total energy, H represents total enthalpy, p represents intensity of pressure, u represents a velocity component in an x-axis direction, v represents a velocity component in a y-axis direction, $V_r$ represents a velocity of relative motion, $V_t$ represents a grid moving velocity, $(n_x, n_y)$ represents a unit normal vector of a grid cell surface, $\tau_{xx}$ represents a viscous stress component acting on a plane perpendicular to an x axis and along the x-axis direction, $\tau_{xy}$ represents a viscous stress component acting on the plane perpendicular to the x axis and along the y-axis direction, $\tau_{yy}$ represents a viscous stress component acting on a plane perpendicular to a y axis and along the y-axis direction, $\Theta_x$ represents a viscous stress term, and $\Theta_y$ represents a heat conduction term;

solving the fluid control equation, wherein a solution of the fluid control equation is $$W = \begin{bmatrix} \rho \\ \rho u \\ \rho v \\ \rho E \end{bmatrix};$$

and calculating the flow field characteristic of the airfoil based on the solution of the fluid control equation.

4. The method for determining a helicopter rotor airfoil according to claim 1, wherein the establishing a mapping relationship between the sample point and the flow field characteristic by using a Kriging model, and training the mapping relationship by using a maximum likelihood estimation method and an EI criterion, to obtain a trained mapping relationship specifically comprises:

establishing the mapping relationship between the sample point and the flow field characteristic by using the Kriging model, wherein the mapping relationship is as follows:

$$\hat{C}l(x) = r_l^T R_l^{-1} Y_l - (F^T R_l^{-1} r_l - f)^T (F^T R_l^{-1} F)^{-1} F^T R_l^{-1} Y_l,$$

$$\hat{C}d(x) = r_d^T R_d^{-1} Y_d - (F^T R_d^{-1} r_d - f)^T (F^T R_d^{-1} F)^{-1} F^T R_d^{-1} Y_d,$$

$$\hat{C}m(x) = r_m^T R_m^{-1} Y_m - (F^T R_m^{-1} r_m - f)^T (F^T R_m^{-1} F)^{-1} F^T R_m^{-1} Y_m,$$

wherein $\hat{C}l$ represents a predicted value of the lift coefficient, $\hat{C}d$ represents a predicted value of the drag coefficient, $\hat{C}m$ represents a predicted value of the moment coefficient, $Y_l$ represents a vector constituted by lift coefficients Cl corresponding to sample points, $Y_d$ represents a vector constituted by drag coefficients Cd corresponding to the sample points, $Y_m$ represents a vector constituted by moment coefficients Cm corresponding to the sample points, $Y_l = [Cl_1 \; Cl_2 \; \ldots \; Cl_{ns}]^T$, $Y_d = [Cd_1 \; Cd_2 \ldots Cd_{ns}]^T$, $Y_m = [Cm_1 \; Cm_2 \ldots Cm_{ns}]^T$, ns represents a quantity of the sample points, $$f = \begin{bmatrix} f_1(x) \\ \vdots \\ f_p(x) \end{bmatrix}, F = \begin{bmatrix} f_1(x_1) & \cdots & f_p(x_1) \\ \vdots & \ddots & \vdots \\ f_1(x_{ns}) & \cdots & f_p(x_{ns}) \end{bmatrix},$$

$f_1(\bullet), \ldots, f_p(\bullet)$ represents a known polynomial function, $x_1$, $x_2$, and $x_{ns}$ are all vectors constituted by sample points $x_j^i$, $x_1 = [x_1^1 \; x_1^2 \; \ldots \; x_1^e]$, $x_2 = [x_2^1 \; x_2^2 \; \ldots \; x_2^e]$, $x_{ns} = [x_{ns}^1 \; x_{ns}^2 \; \ldots \; x_{ns}^e]$, e represents a vector dimension, i represents the number of a variable, j represents a number of the sample point, $$R_l = \begin{bmatrix} R_l(x_1, x_1) & \cdots & R_l(x_1, x_{ns}) \\ \vdots & \ddots & \vdots \\ R_l(x_{ns}, x_1) & \cdots & R_l(x_{ns}, x_{ns}) \end{bmatrix}, r_l = \begin{bmatrix} R_l(x, x_1) \\ R_l(x, x_2) \\ \vdots \\ R_l(x, x_{ns}) \end{bmatrix},$$

$$R_l(x_{j1}, x_{j2}) = \prod_{i=1}^{n} (-\theta_{li}|x_{j1}^i - x_{j2}^i|)^{p_{li}},$$

$\theta_{li}$ and $p_{li}$ represent unknown parameters corresponding to the lift coefficient, $\theta_{li}$ and $p_{li}$ are obtained by calculating $$\max\left(-\frac{ns}{2}\ln\left(\frac{(Y_l - F\hat{\beta}_l)^T R_l^{-1}(Y_l - F\hat{\beta}_l)}{n_s}\right) - \frac{1}{2}\ln[|R_l|]\right),$$

$$\hat{\beta}_l = (F^T R_l^{-1} F)^{-1} F^T R_l^{-1} Y_l,$$

$$R_d = \begin{bmatrix} R_d(x_1, x_1) & \cdots & R_d(x_1, x_{ns}) \\ \vdots & \ddots & \vdots \\ R_d(x_{ns}, x_1) & \cdots & R_d(x_{ns}, x_{ns}) \end{bmatrix}, r_d = \begin{bmatrix} R_d(x, x_1) \\ R_d(x, x_2) \\ \vdots \\ R_d(x, x_{ns}) \end{bmatrix},$$

$$R_d(x_{j1}, x_{j2}) = \prod_{i=1}^{n} \exp(-\theta_{di}|x_{j1}^i - x_{j2}^i|)^{P_{di}},$$

$\theta_{di}$ and $p_{di}$ represent unknown parameters corresponding to the drag coefficient, $\theta_{di}$ and $p_{di}$ are obtained by calculating $$\max\left(-\frac{n_s}{2}\ln\left(\frac{(Y_d - F\hat{\beta}_d)^T R_d^{-1}(Y_d - F\hat{\beta}_d)}{n_s}\right) - \frac{1}{2}\ln[|R_d|]\right),$$

$$\hat{\beta}_d = (F^T R_d^{-1} F)^{-1} F^T R_d^{-1} Y_d,$$

$$R_m = \begin{bmatrix} R_m(x_1, x_1) & \cdots & R_m(x_1, x_{ns}) \\ \vdots & \ddots & \vdots \\ R_m(x_{ns}, x_1) & \cdots & R_m(x_{ns}, x_{ns}) \end{bmatrix}, r_d = \begin{bmatrix} R_m(x, x_1) \\ R_m(x, x_2) \\ \vdots \\ R_m(x, x_{ns}) \end{bmatrix},$$

$$R_m(x_{j1}, x_{j2}) = \prod_{i=1}^{n} \exp(-\theta_{mi}|x_{j1}^i - x_{j2}^i|)^{P_{mi}},$$

$\theta_{mi}$ and $p_{mi}$ represent unknown parameters corresponding to the moment coefficient, $\theta_{mi}$ and $p_{mi}$ are obtained by calculating $$\max\left(-\frac{n_s}{2}\ln\left(\frac{(Y_m - F\hat{\beta}_m)^T R_m^{-1}(Y_m - F\hat{\beta}_m)}{n_s}\right) - \frac{1}{2}\ln[|R_m|]\right), \text{ and}$$

$$\hat{\beta}_m = (F^T R_m^{-1} F)^{-1} F^T R_m^{-1} Y_m;$$

determining an unknown parameter in the mapping relationship by using the maximum likelihood estimation method, to obtain the trained mapping relationship; and improving the trained mapping relationship by using the EI criterion, to obtain the trained mapping relationship.

5. The method for determining a helicopter rotor airfoil according to claim 1, wherein the determining an optimal sample point based on the trained mapping relationship by using NSGA-II specifically comprises:

randomly generating an initial population whose scale is N;

calculating, by using the trained mapping relationship, a lift coefficient, a drag coefficient, and a moment coefficient that correspond to each individual in a current-generation population;

performing fast non-dominated sorting on all individuals in the current-generation population based on the lift coefficient, the drag coefficient, and the moment coefficient that correspond to each individual in the current-generation population, and obtaining a current-generation parent population by performing selection, crossover, and mutation based on a genetic algorithm, wherein a quantity of population generations is equal to a quantity of iterations of the genetic algorithm;

calculating, by using the trained mapping relationship, a lift coefficient, a drag coefficient, and a moment coefficient that correspond to each individual in the current-generation parent population;

performing fast non-dominated sorting on all individuals in the current-generation parent population based on the lift coefficient, the drag coefficient, and the moment coefficient that correspond to each individual in the current-generation parent population, and obtaining a current-generation child population by performing selection, crossover, and mutation based on the genetic algorithm;

combining the current-generation parent population and the current-generation child population to obtain a combined current-generation population;

calculating, by using the trained mapping relationship, a lift coefficient, a drag coefficient, and a moment coefficient that correspond to each individual in the combined current-generation population;

performing fast non-dominated sorting on all individuals in the combined current-generation population based on the lift coefficient, the drag coefficient, and the moment coefficient that correspond to each individual in the combined current-generation population, and calculating an individual crowdedness degree in each non-dominated layer;

selecting, from the combined current-generation population based on a result of fast non-dominated sorting and the individual crowdedness degree, an individual that satisfies a preset condition, to constitute a next-generation parent population;

determining whether a sequence number of a generation to which the next-generation parent population belongs is equal to a preset maximum quantity of iterations; and if the sequence number of the generation to which the next-generation parent population belongs is not equal to the preset maximum quantity of iterations, using the next-generation parent population as a current-generation parent population, and returning to the step of calculating, by using the trained mapping relationship, a lift coefficient, a drag coefficient, and a moment coefficient that correspond to each individual in the current-generation parent population; or if the sequence number of the generation to which the next-generation parent population belongs is equal to the preset maximum quantity of iterations, determining an individual in the next-generation parent population as the optimal sample point.

6. A system for determining a helicopter rotor airfoil, the system comprising a processor and a memory stored with program instructions, the processor executes the instructions in the memory for:

randomly generating a sample point by using an LHS method;

determining characterization equations of upper and lower airfoil surfaces of an airfoil based on the sample point by using a CST method;

performing dynamic characteristic simulation on the airfoil according to the characterization equations of the upper and lower airfoil surfaces by using a CFD method, to obtain a flow field characteristic of the airfoil, wherein the flow field characteristic comprises a lift coefficient, a drag coefficient, and a moment coefficient;

establishing a mapping relationship between the sample point and the flow field characteristic by using a Kriging model, and training the mapping relationship by using a maximum likelihood estimation method and an EI criterion, to obtain a trained mapping relationship;

determining an optimal sample point based on the trained mapping relationship by using NSGA-II, wherein the optimal sample point corresponds to an optimal flow field characteristic, and the optimal flow field characteristic comprises an optimal lift coefficient, an optimal drag coefficient, and an optimal moment coefficient; and determining a shape of a rotor airfoil based on the optimal sample point.

7. The system for determining a helicopter rotor airfoil according to claim 6, wherein the characterization equations of the upper and lower airfoil surfaces are as follows:

$$\begin{cases} \psi_u(\zeta) = C(\zeta) \cdot \sum_{k=0}^{n} A_u^k \cdot S_k(\zeta) + \zeta \cdot \Delta z_u \\ \psi_l(\zeta) = C(\zeta) \cdot \sum_{k=0}^{n} A_l^k \cdot S_k(\zeta) + \zeta \cdot \Delta z_l \end{cases}$$

wherein $\psi_u = y_u/c$, $\psi_l = y_l/c$; $\psi_u$ represents a dimensionless vertical coordinate of a point on the upper airfoil surface of the airfoil; $\psi_l$ represents a dimensionless vertical coordinate of a point on the lower airfoil surface of the airfoil; $y_u$ represents a vertical coordinate of the point on the upper airfoil surface of the airfoil; $y_l$ represents a vertical coordinate of the point on the lower airfoil surface of the airfoil; c represents a chord length of the airfoil; $\zeta = x/c$; $\zeta$ represents a dimensionless horizontal coordinate of a point on the airfoil; x represents a horizontal coordinate of the point on the airfoil; $\Delta z_u = y_{u_{TE}}/c$, $\Delta z_l = y_{l_{TE}}/c$; $\Delta z_u$ represents a dimensionless trailing edge thickness of the upper airfoil surface of the airfoil; $\Delta z_l$ represents a dimensionless trailing edge thickness of the lower airfoil surface of the airfoil; $y_{u_{TE}}$ represents a vertical coordinate of a trailing edge point on the upper airfoil surface of the airfoil; $y_{l_{TE}}$ represents a vertical coordinate of a trailing edge point on the lower airfoil surface of the airfoil; $C(\zeta) = \zeta^{N_1} \cdot (1-\zeta)^{N_2}$; $C(\zeta)$ represents a class function; $N_1$ and $N_2$ are both constants; $A_u^k$ represents a coefficient for controlling a profile of the upper airfoil surface of the airfoil; $A_l^k$ represents a coefficient for controlling a profile of the lower airfoil surface of the airfoil; k represents a coefficient number; for the $j^{th}$ sample point $x_j^i$, $A_{uj}^k = f(A_{ui}^k, x_j^i)$, $A_{lj}^k = f(A_{li}^k, x_j^i)$, i represents a number of the variable, and $f(\cdot)$ represents a transformation function; n represents a total quantity of coefficients; $S_k(\zeta)$ represents a shape function;

$$S_k(\zeta) = \frac{b!}{a!(b-k)!} \cdot \zeta^k \cdot (1-\zeta)^{b-k};$$

a represents a number of a polynomial; b represents an order of the polynomial; and a=0, 1, . . . , b.

8. The system for determining a helicopter rotor airfoil according to claim 6, wherein the performing dynamic characteristic simulation on the airfoil according to the characterization equations of the upper and lower airfoil surfaces by using a CFD method comprises:

determining coordinates of the sample point according to the characterization equations of the upper and lower airfoil surfaces;

determining an initial grid, wherein the initial grid is generated based on the coordinates of the sample point;

generating, based on the initial grid and by using a Poisson equation-based elliptic equation grid generation method, a C-shaped body-fitted grid around the airfoil, wherein the Poisson equation is as follows:

$$\begin{cases} \xi_{\zeta\zeta} + \xi_{\psi\psi} = P(\xi, \eta) \\ \eta_{\zeta\zeta} + \eta_{\psi\psi} = Q(\xi, \eta) \end{cases}$$

wherein $(\xi,\eta)$ represents a point in a curvilinear coordinate system under a calculation plane, there is a mapping relationship between $(\xi,\eta)$ and a point $(\zeta,\psi)$ in a linear coordinate system under a physical plane, $$\xi_{\zeta\zeta} = \frac{\partial^2 \xi}{\partial \zeta^2}, \xi_{\psi\psi} = \frac{\partial^2 \xi}{\partial \psi^2}, \eta_{\zeta\zeta} = \frac{\partial^2 \eta}{\partial \zeta^2}, \eta_{\psi\psi} = \frac{\partial^2 \eta}{\partial \psi^2},$$

$P(\xi,\eta)$ represents an orthogonality control function, and $Q(\xi,\eta)$ represents a spacing control function;

calculating an area and a volume of each grid cell in the C-shaped body-fitted grid;

determining a fluid control equation based on the area, the volume, a conservative variable, a convective flux term, and a viscous flux term, wherein the fluid control equation is as follows:

$$\frac{\partial}{\partial t} \iiint_\Omega W d\Omega + \iint_{\partial\Omega} (F_c - F_v) dS = 0$$

wherein t represents physical time, $F_c$ represents the convective flux term, $F_v$ represents the viscous flux term, $\Omega$ represents the volume of the grid cell, S represents the area of the grid cell, W represents the conservative variable, $$W = \begin{bmatrix} \rho \\ \rho u \\ \rho v \\ \rho E \end{bmatrix}, F_c = \begin{bmatrix} \rho V_r \\ \rho u V_r + n_x p \\ \rho v V_r + n_y p \\ \rho H V_r + V_t p \end{bmatrix}, F_v = \begin{bmatrix} 0 \\ n_x \tau_{xx} + n_y \tau_{xy} \\ n_x \tau_{yx} + n_y \tau_{yy} \\ n_x \Theta_x + n_y \Theta_y \end{bmatrix},$$

$\rho$ represents air density, E represents total energy, H represents total enthalpy, p represents intensity of pressure, u represents a velocity component in an x-axis direction, v represents a velocity component in a y-axis direction, $V_r$ represents a velocity of relative motion, $V_t$ represents a grid moving velocity, $(n_x,n_y)$ represents a unit normal vector of a grid cell surface, $\tau_{xx}$ represents a viscous stress component acting on a plane perpendicular to an x axis and along the x-axis direction, $\tau_{xy}$ represents a viscous stress component acting on the plane perpendicular to the x axis and along the y-axis direction, $\tau_{yy}$ represents a viscous stress component acting on a plane perpendicular to a y axis and along the y-axis direction, $\Theta_x$ represents a viscous stress term, and $\Theta_y$ represents a heat conduction term;

solving the fluid control equation, wherein a solution of the fluid control equation is $$W = \begin{bmatrix} \rho \\ \rho u \\ \rho v \\ \rho E \end{bmatrix};$$

and
calculating the flow field characteristic of the airfoil based on the solution of the fluid control equation.

9. The system for determining a helicopter rotor airfoil according to claim 6, wherein the establishing a mapping relationship between the sample point and the flow field characteristic by using a Kriging model and training the mapping relationship by using a maximum likelihood estimation method and an EI criterion comprises:
establishing the mapping relationship between the sample point and the flow field characteristic by using the Kriging model, wherein the mapping relationship is as follows:

$\hat{C}l(x) = r_l^T R_l^{-1} Y_l - (F^T R_l^{-1} r_l - f)^T (F^T R_l^{-1} F)^{-1} F^T R_l^{-1} Y_l,$ $\hat{C}d(x) = r_d^T R_d^{-1} Y_d - (F^T R_d^{-1} r_d - f)^T (F^T R_d^{-1} F)^{-1} F^T R_d^{-1} Y_d,$ $\hat{C}m(x) = r_m^T R_m^{-1} Y_m - (F^T R_m^{-1} r_m - f)^T (F^T R_m^{-1} F)^{-1} F^T R_m^{-1} Y_m,$ wherein $\hat{C}l$ represents a predicted value of the lift coefficient, $\hat{C}d$ represents a predicted value of the drag coefficient, $\hat{C}m$ represents a predicted value of the moment coefficient, $Y_l$ represents a vector constituted by lift coefficients Cl corresponding to sample points, $Y_d$ represents a vector constituted by drag coefficients Cd corresponding to the sample points, $Y_m$ represents a vector constituted by moment coefficients Cm corresponding to the sample points, $Y_l = [Cl_1\ Cl_2\ \ldots\ Cl_{ns}]^T$, $Y_d = [Cd_1\ Cd_2\ \ldots\ Cd_{ns}]^T$, $Y_m = [Cm_1\ Cm_2\ \ldots\ Cm_{ns}]^T$, ns represents a quantity of the sample points, $$f = \begin{bmatrix} f_1(x) \\ \vdots \\ f_p(x) \end{bmatrix}, F = \begin{bmatrix} f_1(x_1) & \cdots & f_p(x_1) \\ \vdots & \ddots & \vdots \\ f_1(x_{ns}) & \cdots & f_p(x_{ns}) \end{bmatrix},$$

$f_1(\bullet), \ldots, f_p(\bullet)$ represents a known polynomial function, $x_1, x_2,$ and $x_{ns}$ are all vectors constituted by sample points $x_j^i$, $x_1 = [x_1^1\ x_1^2\ \ldots\ x_1^e]$, $x_2 = [x_2^1\ x_2^2\ \ldots\ x_2^e]$, $x_{ns} = [x_{ns}^1\ x_{ns}^2\ \ldots\ x_{ns}^e]$, e represents a vector dimension, i represents the number of a variable, j represents a number of the sample point, $$R_l = \begin{bmatrix} R_l(x_1, x_1) & \cdots & R_l(x_1, x_{ns}) \\ \vdots & \ddots & \vdots \\ R_l(x_{ns}, x_1) & \cdots & R_l(x_{ns}, x_{ns}) \end{bmatrix}, r_l = \begin{bmatrix} R_l(x, x_1) \\ R_l(x, x_2) \\ \vdots \\ R_l(x, x_{ns}) \end{bmatrix},$$

$$R_l(x_{j1}, x_{j2}) = \prod_{i=1}^{n} \exp(-\theta_{li}|x_{j1}^i - x_{j2}^i|)^{p_{li}},$$

$\theta_{li}$ and $p_{li}$ represent unknown parameters corresponding to the lift coefficient, $\theta_{li}$ and $p_{li}$ are obtained by calculating $$\max\left(-\frac{ns}{2}\ln\left(\frac{(Y_l - F\hat{\beta}_l)^T R_l^{-1}(Y_l - F\hat{\beta}_l)}{n_s}\right) - \frac{1}{2}\ln[|R_l|]\right),$$

$\hat{\beta}_l = (F^T R_l^{-1} F)^{-1} F^T R_l^{-1} Y_l,$ $$R_d = \begin{bmatrix} R_d(x_1, x_1) & \cdots & R_d(x_1, x_{ns}) \\ \vdots & \ddots & \vdots \\ R_d(x_{ns}, x_1) & \cdots & R_d(x_{ns}, x_{ns}) \end{bmatrix}, r_d = \begin{bmatrix} R_d(x, x_1) \\ R_d(x, x_2) \\ \vdots \\ R_d(x, x_{ns}) \end{bmatrix},$$

$$R_d(x_{j1}, x_{j2}) = \prod_{i=1}^{n} \exp(-\theta_{di}|x_{j1}^i - x_{j2}^i|)^{p_{di}},$$

$\theta_{di}$ and $p_{di}$ represent unknown parameters corresponding to the drag coefficient, $\theta_{di}$ and $p_{di}$ are obtained by calculating $$\max\left(-\frac{n_s}{2}\ln\left(\frac{(Y_d - F\hat{\beta}_d)^T R_d^{-1}(Y_d - F\hat{\beta}_d)}{n_s}\right) - \frac{1}{2}\ln[|R_d|]\right),$$

$\hat{\beta}_d = (F^T R_d^{-1} F)^{-1} F^T R_d^{-1} Y_d,$ $$R_m = \begin{bmatrix} R_m(x_1, x_1) & \cdots & R_m(x_1, x_{ns}) \\ \vdots & \ddots & \vdots \\ R_m(x_{ns}, x_1) & \cdots & R_m(x_{ns}, x_{ns}) \end{bmatrix}, r_d = \begin{bmatrix} R_m(x, x_1) \\ R_m(x, x_2) \\ \vdots \\ R_m(x, x_{ns}) \end{bmatrix},$$

$$R_m(x_{j1}, x_{j2}) = \prod_{i=1}^{n} \exp(-\theta_{mi}|x_{j1}^i - x_{j2}^i|)^{p_{mi}},$$

$\theta_{mi}$ and $p_{mi}$ represent unknown parameters corresponding to the moment coefficient, $\theta_{mi}$ and $p_{mi}$ are obtained by calculating $$\max\left(-\frac{n_s}{2}\ln\left(\frac{(Y_m - F\hat{\beta}_m)^T R_m^{-1}(Y_m - F\hat{\beta}_m)}{n_s}\right) - \frac{1}{2}\ln[|R_m|]\right),$$

and $\hat{\beta}_m = (F^T R_m^{-1} F)^{-1} F^T R_m^{-1} Y_m;$
determining an unknown parameter in the mapping relationship by using the maximum likelihood estimation method, to obtain the trained mapping relationship; and
improving the trained mapping relationship by using the EI criterion, to obtain the trained mapping relationship.

10. The system for determining a helicopter rotor airfoil according to claim 6, wherein the determining an optimal sample point based on the trained mapping relationship by using NSGA-II comprises:
randomly generating an initial population whose scale is N;
calculating, by using the trained mapping relationship, a lift coefficient, a drag coefficient, and a moment coefficient that correspond to each individual in a current-generation population;
performing fast non-dominated sorting on all individuals in the current-generation population based on the lift coefficient, the drag coefficient, and the moment coefficient that correspond to each individual in the current-generation population, and obtaining a current-generation parent population by performing selection, crossover, and mutation based on a genetic algorithm, wherein a quantity of population generations is equal to a quantity of iterations of the genetic algorithm;

calculating, by using the trained mapping relationship, a lift coefficient, a drag coefficient, and a moment coefficient that correspond to each individual in the current-generation parent population;

performing fast non-dominated sorting on all individuals in the current-generation parent population based on the lift coefficient, the drag coefficient, and the moment coefficient that correspond to each individual in the current-generation parent population, and obtaining a current-generation child population by performing selection, crossover, and mutation based on the genetic algorithm;

combining the current-generation parent population and the current-generation child population to obtain a combined current-generation population;

calculating, by using the trained mapping relationship, a lift coefficient, a drag coefficient, and a moment coefficient that correspond to each individual in the combined current-generation population;

performing fast non-dominated sorting on all individuals in the combined current-generation population based on the lift coefficient, the drag coefficient, and the moment coefficient that correspond to each individual in the combined current-generation population, and calculating an individual crowdedness degree in each non-dominated layer;

selecting, from the combined current-generation population based on a result of fast non-dominated sorting and the individual crowdedness degree, an individual that satisfies a preset condition, to constitute a next-generation parent population; and determining whether a sequence number of a generation to which the next-generation parent population belongs is equal to a preset maximum quantity of iterations; if the sequence number of the generation to which the next-generation parent population belongs is not equal to the preset maximum quantity of iterations, using the next-generation parent population as a current-generation parent population, and performing the operation performed by the second calculation unit; or if the sequence number of the generation to which the next-generation parent population belongs is equal to the preset maximum quantity of iterations, determining an individual in the next-generation parent population as the optimal sample point.

\* \* \* \* \*